(12) United States Patent
Rabii

(10) Patent No.: US 9,218,034 B2
(45) Date of Patent: Dec. 22, 2015

(54) USER-DIRECTED MOTION GESTURE CONTROL

(71) Applicant: QUALCOMM Incorporated, San Diego, CA (US)

(72) Inventor: Khosro Mohammad Rabii, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 14/180,116

(22) Filed: Feb. 13, 2014

(65) Prior Publication Data

US 2015/0227180 A1    Aug. 13, 2015

(51) Int. Cl.
| | |
|---|---|
| *G06F 1/26* | (2006.01) |
| *G06F 3/01* | (2006.01) |
| *G06F 1/32* | (2006.01) |
| *G04G 19/12* | (2006.01) |
| *H04W 52/02* | (2009.01) |
| *G06F 3/0346* | (2013.01) |

(52) U.S. Cl.
CPC *G06F 1/26* (2013.01); *G04G 19/12* (2013.01); *G06F 1/3203* (2013.01); *G06F 1/3231* (2013.01); *G06F 1/3234* (2013.01); *G06F 3/014* (2013.01); *G06F 3/017* (2013.01); *G06F 3/0346* (2013.01); *H04W 52/0254* (2013.01)

(58) Field of Classification Search
CPC ... G06F 3/017; G06F 3/04883; G06F 3/0304; G06F 3/011; G06F 3/0488; G06F 1/163; G06F 3/0346; G06F 3/041; G06F 1/3203; G06F 1/1626; G06F 1/3262; G06F 1/3265; G06F 2200/1637; G06F 2203/04808; G06F 3/014; G06K 9/00335

USPC ............ 345/156, 158, 173, 8; 715/863; 713/323, 300
See application file for complete search history.

(56) References Cited

U.S. PATENT DOCUMENTS

| | | | |
|---|---|---|---|
| 5,666,541 A | * | 9/1997 | Sellers ............ 713/324 |
| 8,503,932 B2 | | 8/2013 | Demuynck et al. |
| 2009/0051648 A1 | * | 2/2009 | Shamaie et al. ....... 345/156 |

(Continued)

FOREIGN PATENT DOCUMENTS

CN    103217895 A    7/2013

OTHER PUBLICATIONS

International Search Report and Written Opinion—PCT/US2015/013117—ISA/EPO—Apr. 10, 2015.
Raghunath, M.T., et al., "User Interfaces for Applications on a Wrist Watch," Personal and Ubiquitous Computing Journal, vol. 6, Issue 1, Feb. 2002, pp. 17-30.

(Continued)

*Primary Examiner* — Koosha Sharifi-Tafreshi
(74) *Attorney, Agent, or Firm* — Silicon Valley Patent Group LLP

(57) ABSTRACT

Apparatuses and methods for user-directed motion gesture control are disclosed. According to aspects of the present disclosure, direct user inputs can be used to predictably manipulate power control behavior. In some embodiments, a wearable mobile device may be configured to accept user commands, and be configured to sense multitude of use, use environment, and use contexts. The wearable mobile device may include a memory configured to store a set of reference power control motion gesture sequences, one or more sensors configured to sense a motion gesture sequence, and a controller configured to provide interactive power control of the device using the motion gesture sequence and the set of reference power control motion gesture sequences.

26 Claims, 10 Drawing Sheets

FIG. 8B

(56) References Cited

U.S. PATENT DOCUMENTS

| | | |
|---|---|---|
| 2009/0195497 A1* | 8/2009 | Fitzgerald et al. ............ 345/156 |
| 2010/0235667 A1* | 9/2010 | Mucignat et al. ............. 713/323 |
| 2011/0080339 A1 | 4/2011 | Sun et al. |
| 2012/0007713 A1 | 1/2012 | Nasiri et al. |
| 2012/0092822 A1* | 4/2012 | Mooring et al. ......... 361/679.21 |
| 2012/0319940 A1 | 12/2012 | Bress et al. |
| 2013/0191741 A1 | 7/2013 | Dickinson et al. |
| 2013/0234924 A1 | 9/2013 | Janefalkar et al. |
| 2014/0143737 A1* | 5/2014 | Mistry et al. .................. 715/854 |
| 2014/0157026 A1* | 6/2014 | So et al. ........................ 713/323 |

OTHER PUBLICATIONS

Siegwart, R., et al., "Chapter 4, Sensor Modalities," Introduction to Autonomous Mobile Robots, Massachusetts Institute of Technology, 2004, 27 pages.

Junker, H., et al., "Gesture spotting with body-worn inertial sensors to detect user activities," Pattern Recognition 41, 2008, pp. 2010-2024.

Kratz, S., et al., "Gesture Recognition Using Motion Estimation on Mobile Phones," PERMID '07. 3rd Intl. Workshop on Pervasive Mobile Interaction Devices at Pervasive 2007, 5 pages.

* cited by examiner

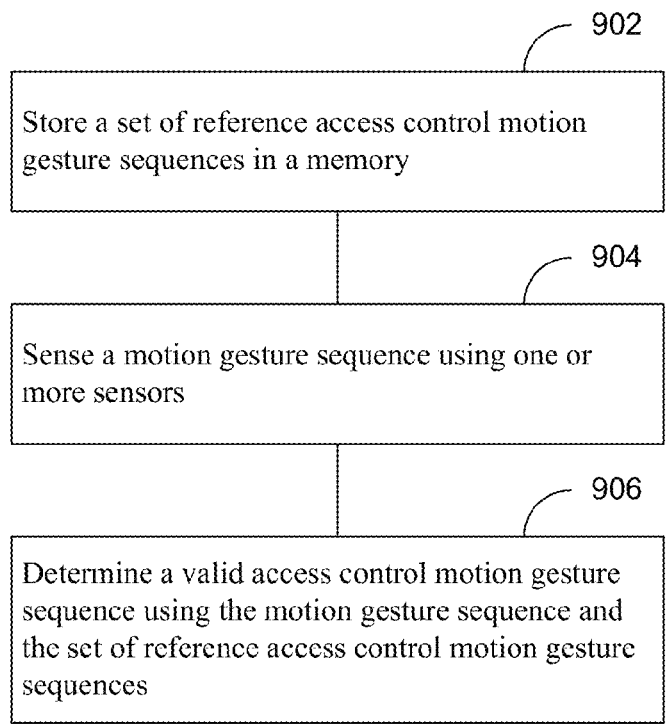
FIG. 9A
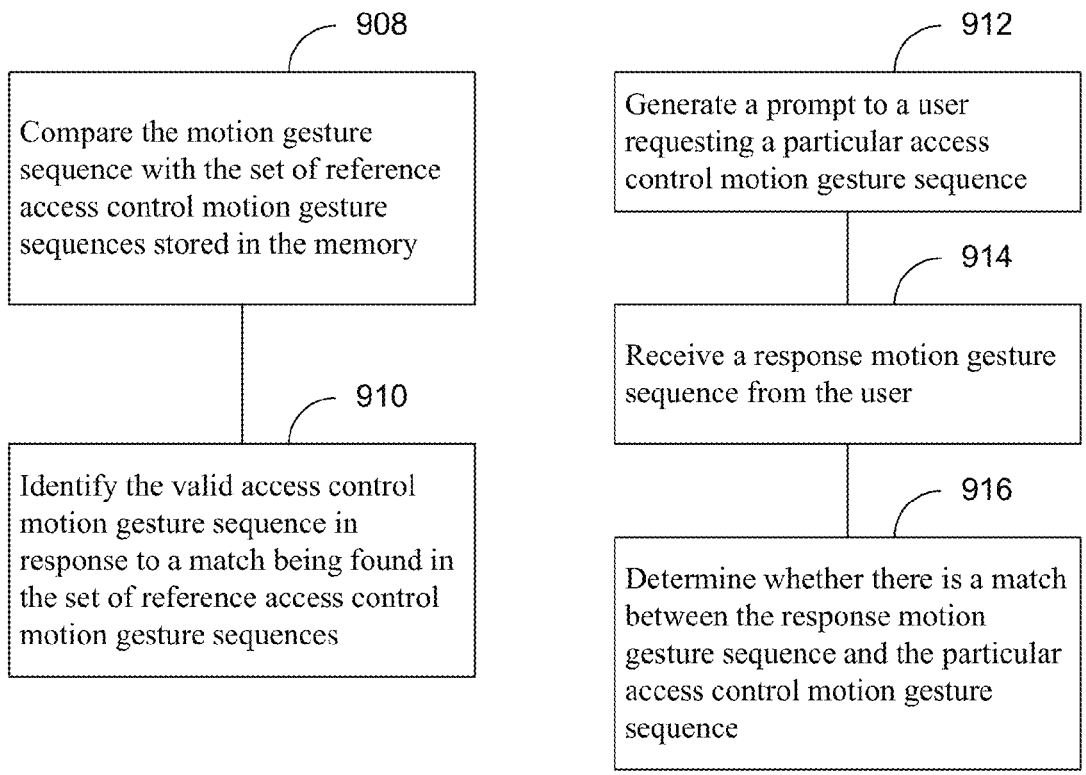
FIG. 9B
FIG. 9C

USER-DIRECTED MOTION GESTURE CONTROL

FIELD

The present disclosure relates to the field of wireless communications. In particular, the present disclosure relates to apparatuses and methods of user-directed motion gesture control.

BACKGROUND

The power control of conventional mobile devices has been typically designed to function in a conservative manner. As a result, timeouts may often be used to lower resources usage. However, such timeouts may often be lengthy and they often may sacrifice power to favor performance for such conventional mobile devices. For example, power control in a conventional mobile phone may typically involve constantly examining sufficiency of specific performance metrics to measure whether it may be warranted for resources to be reduced, or conversely increase resources when performance could be anticipated to become deficient. The generic performance metrics that may be commonly used to measure workload processing performance may include attributes like idleness of the processors, bus arbitration exception rate or bus bandwidth. After measuring such performance metrics, conventional power control methods may speculate future resources level without knowing how platform workload or concurrency may change, often risking resources to become too scarce or too much. Such call-back schemes that require constantly measuring platform resource sufficiency can be inherently costly and unaffordable for always-on wearable devices with small battery capacity, such as wrist-worn watches or head-mount displays.

In addition, battery used in a typical conventional mobile device may have capacity of approximately 2000 mA-Hour. On the other hand, battery used in a wearable mobile device may have capacity that cannot exceed approximately 50 mA-Hour, with similar type, volume, and weight density of battery as used in the conventional mobile device. Moreover, since a wearable mobile device can be expected to be constantly worn and in-touch with a user, it may be desirable for the wearable mobile device to be always-on to enable many essential applications, such as health, security, surveillance applications. In such situations, it can be even more critical to enable power control and access control to such wearable mobile devices. Therefore, it would be beneficial to control power and performance more efficiently for such wearable mobile devices.

SUMMARY

The present disclosure relates to apparatuses and methods for providing power control of a device. In one embodiment, a method for providing power control of a device may include storing a set of reference power control motion gesture sequences in a memory, sensing a motion gesture sequence using one or more sensors, and providing interactive power control of the device using the motion gesture sequence and the set of reference power control motion gesture sequences.

In another embodiment, a device may comprise a memory configured to store a set of reference power control motion gesture sequences, one or more sensors configured to sense a motion gesture sequence, and a controller configured to provide interactive power control of the device using the motion gesture sequence and the set of reference power control motion gesture sequences.

In yet another embodiment, a computer program product may comprise non-transitory medium storing instructions for execution by one or more computer systems. The instructions may comprise instructions for storing a set of reference power control motion gesture sequences in a memory, instructions for sensing a motion gesture sequence using one or more sensors, and instructions for providing interactive power control of the device using the motion gesture sequence and the set of reference power control motion gesture sequences.

In yet another embodiment, an apparatus may comprise means for storing a set of reference power control motion gesture sequences in a memory, means for sensing a motion gesture sequence using one or more sensors, and means for providing interactive power control of the device using the motion gesture sequence and the set of reference power control motion gesture sequences.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the non-limiting and non-exhaustive aspects of following drawings. Like numbers are used throughout the figures.

FIG. 9A illustrates an exemplary method for providing access control according to aspects of the present disclosure.

FIG. 9B illustrates an exemplary implementation of determining a valid motion gesture sequence for access control according to aspects of the present disclosure.

FIG. 9C illustrates another exemplary implementation of determining a valid motion gesture sequence for access control according to aspects of the present disclosure.

DESCRIPTION OF EMBODIMENTS

Embodiments of providing power control and providing access control of a wearable mobile device are disclosed. The following descriptions are presented to enable a person skilled in the art to make and use the disclosure. Descriptions of specific embodiments and applications are provided only as examples. Various modifications and combinations of the examples described herein may be readily apparent to those skilled in the art, and the general principles defined herein may be applied to other examples and applications without departing from the scope of the disclosure. Thus, the present disclosure is not intended to be limited to the examples described and shown, but is to be accorded the scope consistent with the principles and features disclosed herein. The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

According to aspects of the present disclosure, direct user inputs can be used to predictably manipulate power control behavior. In some embodiments, a wearable mobile device may be configured to accept user commands (via direct, voice/aural, and/or visual inputs), and be configured to sense multitude of use, use environment, and use contexts, including but not limited to, biometric signs/signals, nearness/presence, pressure, stability/vibration, location/position, orientation, heading, kinetics, etc.

According to aspects of the present disclosure, a wearable mobile device can be configured to receive user directed inputs. Using a motion gesture sequence, a user may directly manipulate operation of the underlying platform including performing power control. For example, one motion gesture sequence may be used to alter a sleep timer for power control; another motion gesture sequence may be used to defer the wearable mobile device from entering into a power saving mode, etc.

Similarly, a motion gesture sequence can be used for performing access control, similar to how characters/numbers and graphical gestures (both can be detected by touch) may be used for access control in conventional mobile devices. A motion gesture sequence may also be used to emulate a security key to control the use of the wearable device, according to a predefined/predetermined authorization motion gesture sequence.

Figure 1:
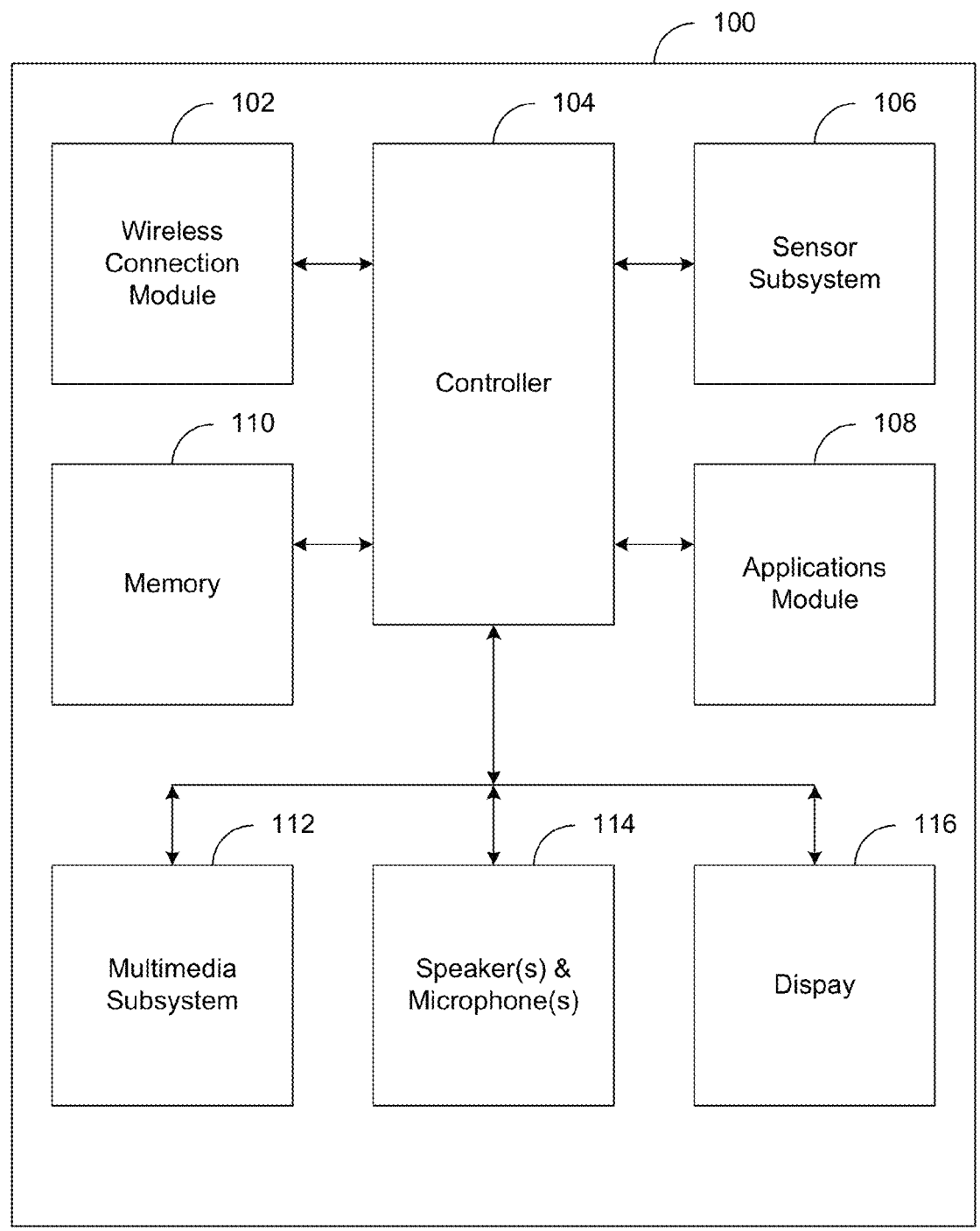
FIG. 1 illustrates an exemplary block diagram of a wearable mobile device according to aspects of the present disclosure.

FIG. 1 illustrates an exemplary block diagram of a wearable mobile device according to aspects of the present disclosure. In the example shown in FIG. 1, a wearable mobile device 100 may include wireless connection module 102, controller 104, sensor subsystem 106, memory 110, and applications module 108. The wearable mobile device 100 may optionally include multimedia subsystem 112, speaker(s) and microphone(s) 114, and display 116. In some implementations, the wireless connection module 102 may be configured to support WiFi and/or Bluetooth in a wireless local area network (LAN) or wireless personal area network (PAN). The controller 104 may include one or more processors, software, hardware, and firmware to implement various functions described herein. For example, the controller 104 may be configured to implement functions of the wearable mobile device 100 as described in FIG. 3 to FIG. 9A-9C. The sensor subsystem 106 may be configured to sense and process various sensor input data and produce sensor output data to the controller 104. The applications module may include battery charging circuit and power manager, oscillators, phase lock loops, clock generators, and timers.

In certain embodiments, wearable mobile device 100 may comprise a wireless transceiver which is capable of transmitting and receiving wireless signals via a wireless antenna over a wireless communication network. Some embodiments may include multiple wireless transceivers and wireless antennas to enable transmitting and/or receiving signals according to a corresponding multiple wireless communication standards such as, for example, versions of IEEE Std. 802.11, CDMA, WCDMA, LTE, UMTS, GSM, AMPS, Zigbee and Bluetooth, etc.

Wireless connection module 102 may comprise SPS receiver capable of receiving and acquiring SPS signals via a SPS antenna. The SPS receiver may also process, in whole or in part, acquired SPS signals for estimating a location of wearable mobile device 100. In some embodiments, controller 104, memory 110, may also be utilized to process acquired SPS signals, in whole or in part, and/or calculate an estimated location of wearable mobile device 100, in conjunction with the SPS receiver. SPS or other signals for use in performing positioning operations may be stored in memory 140 or registers (not shown).

In various embodiments, controller 104 may be configured to execute one or more machine-readable instructions stored in memory 110 such as on a computer-readable storage medium, such as RAM, ROM, FLASH, or disc drive, just to name a few example. The one or more instructions may be executable by processor(s), specialized processors, or DSP(s). Memory 110 may comprise a non-transitory processor-readable memory and/or a computer-readable memory that stores software code (programming code, instructions, etc.) that are executable by processor(s) and/or DSP(s) to perform functions described herein. Controller 104 may execute instructions to perform one or more aspects of processes/methods discussed below in connection with FIG. 2 to FIG. 9A-9C.

In some implementations, a user interface may comprise any one of several devices such as, for example, multimedia subsystem 112, speakers and microphones 114, and display 116, etc. In a particular implementation, the user interface may enable a user to interact with one or more applications hosted on wearable mobile device 100. For example, devices may store analog or digital signals on memory 110 to be further processed by controller 104 in response to action from a user. Similarly, applications hosted on wearable mobile device 100 may store analog or digital signals on memory 110 to present an output signal to a user.

Wearable mobile device 100 may also comprise a camera for capturing still or moving imagery. The camera may comprise, for example an imaging sensor (e.g., charge coupled device or CMOS imager), lens, analog to digital circuitry, frame buffers, etc. In one implementation, additional processing, conditioning, encoding or compression of signals representing captured images may be performed by controller 104. Alternatively, a video processor may perform conditioning, encoding, compression or manipulation of signals representing captured images. Additionally, the video processor may decode/decompress stored image data for presentation on display 116 of wearable mobile device 100.

Figure 2:
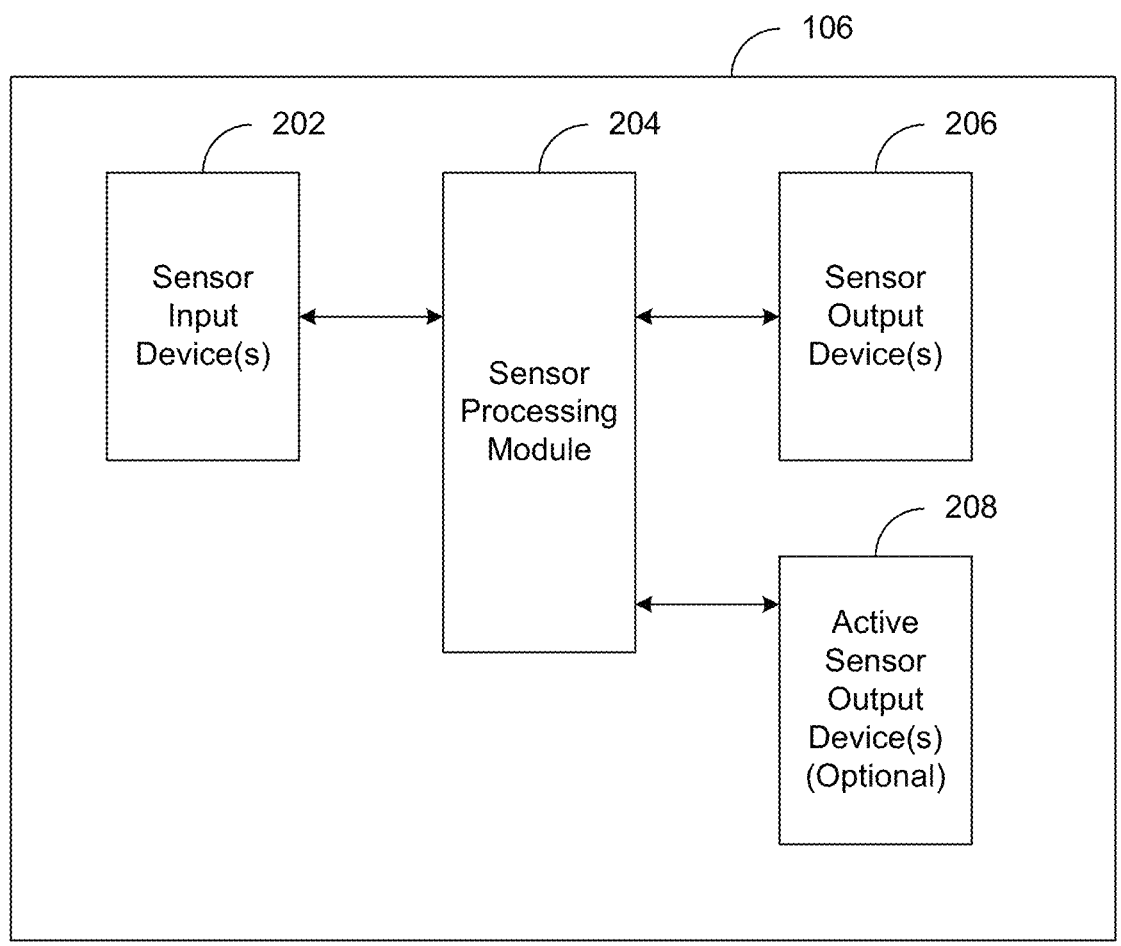
FIG. 2 illustrates an exemplary implementation of the sensor subsystem of the wearable mobile device of FIG. 1 according to aspects of the present disclosure.

FIG. 2 illustrates an exemplary implementation of the sensor subsystem of the wearable mobile device of FIG. 1 according to aspects of the present disclosure. Sensor subsystem 106 may generate analog or digital signals that may be stored in memory 110 and processed by controller 104 in support of one or more applications such as, for example, applications relate to user-directed motion gesture control sequences for power control and/or access control.

As shown in FIG. 2, the sensor subsystem 106 may include one or more sensor input devices 202, sensor processing module 204, one or more sensor output devices 206, and one or more optional active sensor output devices 208. The one or more sensor input devices 202 may include but not limited to, one or more of keys and buttons, temperature and moisture sensors, microphones, ultrasound microphone arrays, photo detectors, image sensors, touch sensors, pressure sensors, chemical sensors, gyroscope, accelerometer, magnetometer, GPS, and Compass. The sensor processing module 204 may be configured to perform one or more of the following functions, including but not limited to: input sensor selection and control, synchronization and timing control, signal processing, sensor platform performance estimation, sensor optimization, sensor fusion, and output sensor/device selection and control. The one or more sensor output devices 206 may produce one or more voice, visual, biometric, nearness, presence, pressure, stability, vibration, location, orientation, heading, kinetics, and chemical signals. The one or more optional active sensor output devices 208 may include one or more light emitting diodes, ultrasound speakers, and radio frequency signal generators. The sensor subsystem 106 may be configured to implement functions of motion gesture detection and analysis as described in FIG. 3 to FIG. 9A-9C.

The sensor processing module 204 can be configured to process sensor input data from the one or more sensor input devices 202, and produced output commands or signals to the one or more sensor output devices 206, and/or to the one or more optional active sensor output devices. According to aspects of the present disclosure, direct user inputs can be used to predictably manipulate power control behavior. In some embodiments, a wearable device may be configured to accept user commands (via direct, voice/aural, and/or visual inputs), and be configured to sense multitude of use, use environment, and use contexts.

Figure 3:
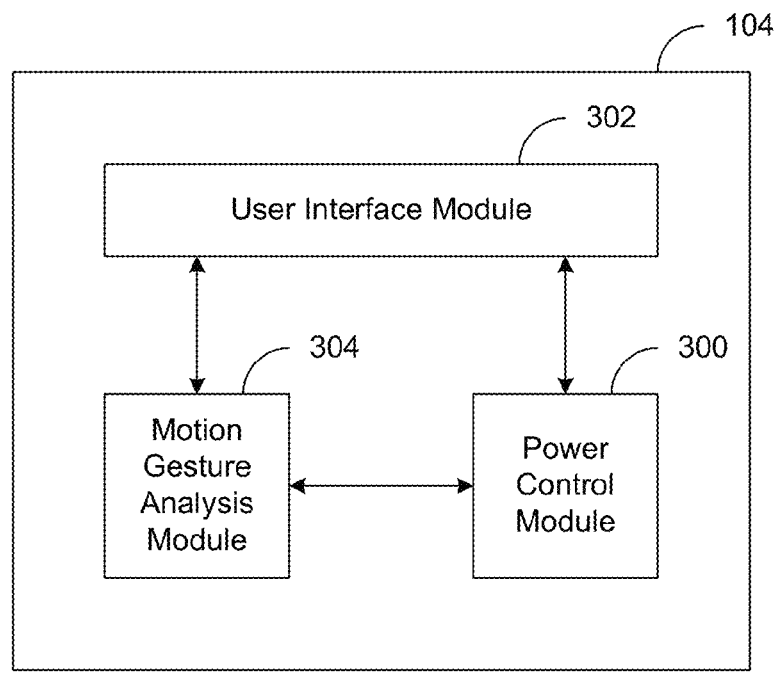
FIG. 3 illustrates an exemplary implementation of a controller configured to provide power control of the wearable mobile device of FIG. 1 according to aspects of the present disclosure.

FIG. 3 illustrates an exemplary implementation of a controller configured to provide power control of the wearable mobile device of FIG. 1 according to aspects of the present disclosure. Using one or more motion gesture sequences, a user may be enabled to control operations of the underlying platform, such as performing power control of the wearable mobile device 100. In the particular embodiment shown in FIG. 3, controller 104 may include power control module 300, user interface module 302, and motion gesture analysis module 304. Controller 104 may further include one or more device managers for controlling sensor input devices 202 and sensor output devices 206 and/or active sensor output devices 208 as described in FIG. 2. Power control module 300 is further described below in association with the descriptions of FIG. 5.

Figure 4:
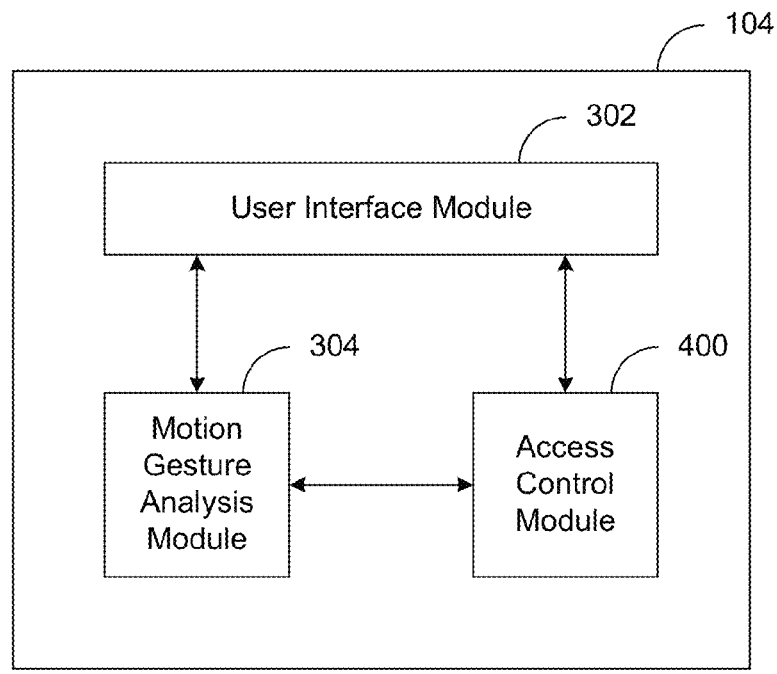
FIG. 4 illustrates an exemplary implementation of a controller configured to provide access control of the wearable mobile device of FIG. 1 according to aspects of the present disclosure.

FIG. 4 illustrates another exemplary implementation of a controller configured to provide access control of the wearable mobile device of FIG. 1 according to aspects of the present disclosure. Similar to the example shown in FIG. 3, using one or more motion gesture sequences, a user may be enabled to control operations of the underlying platform, such as performing access control of the wearable mobile device 100. One or more motion gesture sequences may be used for access control, similar to sequences of characters and numbers as detected by touch sensors in mobile phones and tablet computers. According to aspects of the present disclosure, the one or more motion gesture sequence can be used to emulate an equivalent security key that controls the use of the wearable mobile device based on a predetermined authorization policy. In the particular embodiment shown in FIG. 4, controller 104 may include access control module 400, user interface module 302, and motion gesture analysis module 304. Access control module 400 is further described below in association with the descriptions of FIG. 6.

Figure 5:
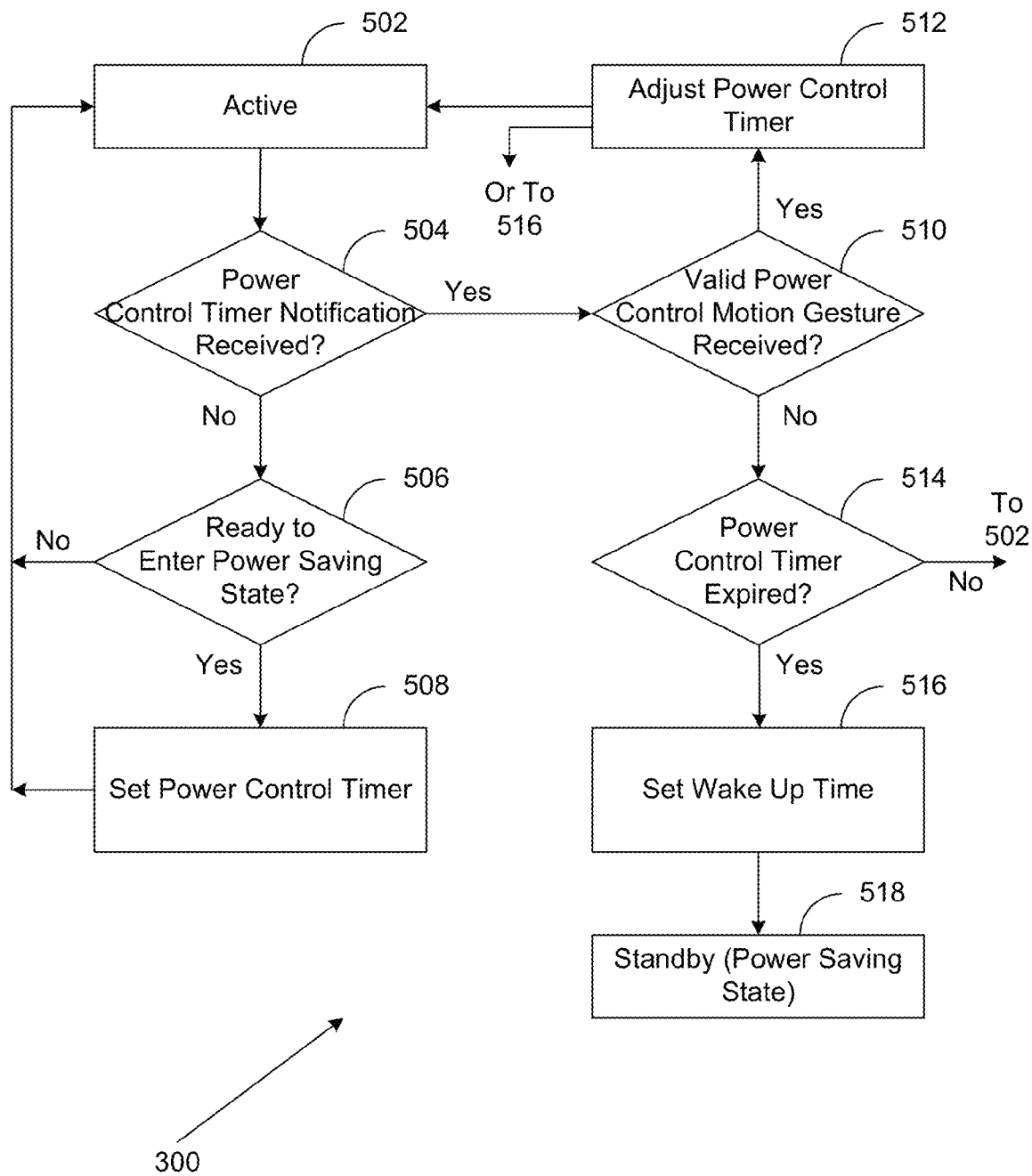
FIG. 5 illustrates an exemplary implementation of the power control module of FIG. 3 according to aspects of the present disclosure.

FIG. 5 illustrates an exemplary implementation of the power control module of FIG. 3 according to aspects of the present disclosure. In the exemplary method shown in FIG. 5, in block 502, the method starts in a state where the wearable mobile device 100 is active. In block 504, the method determines whether a power control timer notification has been received. If a power control timer notification has been received (504_Yes), the method moves to block 510. Alternatively, if a power control timer notification has not been received (504_No), the method moves to block 506. In block 506, the method determines whether the wearable mobile device 100 is ready to enter a power saving state (also referred to as power saving mode or standby mode). If the wearable mobile device 100 is ready to enter a power saving state (506_Yes), the method moves to block 508. Alternatively, if the wearable mobile device 100 is not ready to enter a power saving state (506_No), the method returns to block 502. In block 508, the method sets a power control timer and may optionally send a notification to the user. Then, the method returns to block 502.

In block 510, the method determines whether a valid power control motion gesture sequence has been received. If a valid power control motion gesture sequence has been received (510_Yes), the method moves to block 512. Otherwise, if a valid power control motion gesture sequence has not been received (510_No), the method moves to block 514. In block 514, the method determines whether the power control timer has expired. If the power control timer has expired (514_Yes), the method moves to block 516. Alternatively, if the power control timer has not expired (514_No), the method moves to block 502.

In block 512, the method adjusts the power control timer based on the power control motion gesture sequence received. In one embodiment, the method may increase the power control timer by a first predetermined increment based on a first motion gesture sequence received. For example, in the situation where the user may want to delay the decision and may prefer to be notified again, the first motion gesture sequence may be used. In another embodiment, the method may increase the power control timer by a second predetermined increment based on a second predetermined increment. For example, in the situation where the user may not want to be notified again anytime soon, the second motion gesture may be used. In yet another embodiment, the method may decrease the power control timer by a first predetermined decrement based on a third motion gesture sequence received. For example, in the situation where the user may need a short period of time to finish up a current task, the third motion gesture may be used. In yet another embodiment, the method may put the wearable mobile device 100 into a standby mode immediately based on a fourth motion gesture sequence received. For example, in the situation the user would no longer use the wearable mobile device 100 anytime soon; the fourth motion gesture sequence may be used.

In block 516, the method sets a wake up time prior to entering into a power saving state. In one particular embodiment, the method may use a default wake up time, which may be predefined by the user. In another embodiment, the method may enable the user to set a new wake up time. After block 516, the method moves to block 518, where the wearable mobile device 100 stays in a power saving state.

Figure 6:
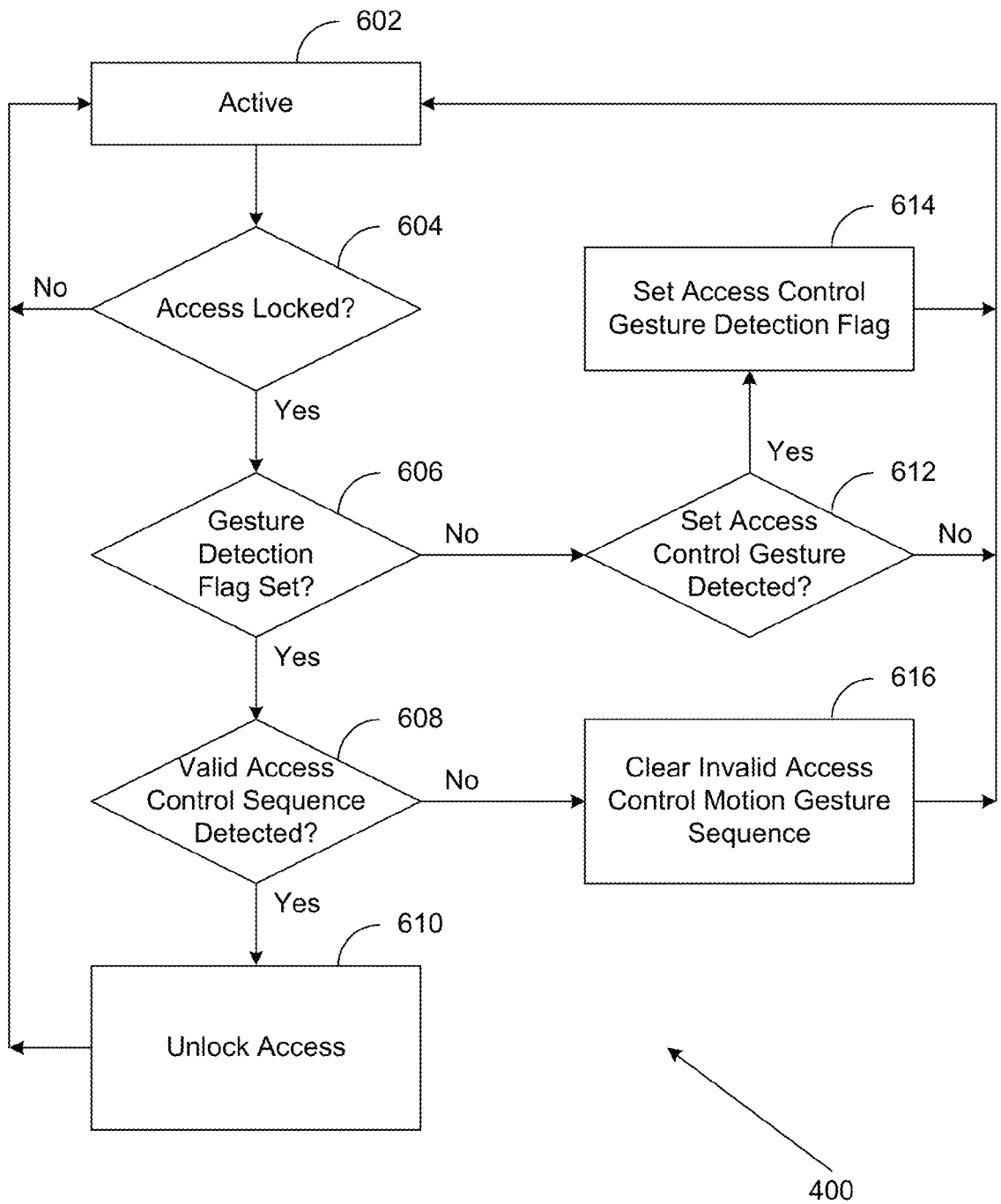
FIG. 6 illustrates an exemplary implementation of the access control module of FIG. 4 according to aspects of the present disclosure.

FIG. 6 illustrates an exemplary implementation of the access control module of FIG. 4 according to aspects of the present disclosure. In the exemplary method shown in FIG. 6, in block 602, the method starts in a state where the wearable mobile device 100 is active. In block 604, the method determines whether the access to the wearable mobile device 100 has been locked. If the access to the wearable mobile device 100 has been locked (604_Yes), the method moves to block 606. Alternatively, if the access to the wearable mobile device 100 has not been locked (604_No), the method moves back to block 602.

In block 606, the method determines whether a gesture detection flag has been set. If the gesture detection flag has been set (606_Yes), the method moves to block 608. Alternatively, if the gesture detection flag has not been set (606_No), the method moves to block 612.

In block 608, the method determines whether a valid access control motion gesture sequence has been detected. According to aspects of the present disclosure, in one embodiment, the method may determine a valid access control motion gesture sequence by comparing the motion gesture sequence with the set of reference access control motion gesture sequences stored in the memory, and identifying the valid access control motion gesture sequence in response to a match being found in the set of reference access control motion gesture sequences. In another embodiment, the method may determine a valid access control motion gesture sequence by generating a prompt to a user requesting a particular access control motion gesture sequence, receiving a response motion gesture sequence from the user, and determining whether there is a match between the response motion gesture sequence and the particular access control motion gesture sequence. If a valid access control motion gesture sequence has been detected (608_Yes), the method moves to block 610. Alternatively, if a valid access control motion gesture sequence has not been detected (608_No), the method moves to block 616.

In block 610, the method may unlock access to the wearable mobile device 100. In some implementations, the method may optionally send a user notification indicating the wearable mobile device 100 has been unlocked.

In block 612, the method determines whether a set access control gesture has been detected. If the set access control gesture has been detected (612_Yes), the method moves to block 614. Alternatively, if the set access control gesture has not been detected (612_No), the method moves back to block 602. For enhanced security, in some implementations, the method may be configured to set the access control gesture detection flag from a predetermined starting position. One example of the set access control motion gesture sequence and the predetermined starting position may be completing a circle in a clockwise manner and from the bottom of the circle, respectively. Another example of the set access control motion gesture sequence and the predetermined starting position may be completing a triangle in a counterclockwise manner and from the top of the triangle, respectively.

In block 614, the method sets access control gesture detection flag. Then, the method returns to block 602. In block 616, the method clears the invalid access control motion gesture sequence and returns to block 602.

According to aspects of the present disclosure, since motion-gesture can be reliably detected, depending on security requirements (e.g., FIPS), access failures may also be used to alter access control profile including access from a host device. Unlike a conventional password or security pattern, which may commonly require two-handed operation, disclosed motion gesture sequence for access control can be performed with a single hand without visual assistance. In addition, unlike the conventional password or security pattern, which may require touch and/or graphics processing, the disclosed methods for power control can be efficiently processed and/or decoded by a sensor subsystem with substantially lower overhead on the a controller of the mobile device or on a host device.

According to aspects of the present disclosure, a combination of a motion gesture sequence along with haptic interactions with a user can offer highly secure interactive challenge-response access control to implement nearly zero-knowledge access control. For example, haptic messages can be used to confidentially steer the user to enter a requested motion gesture sequence for access control and authentication.

Figure 7A:
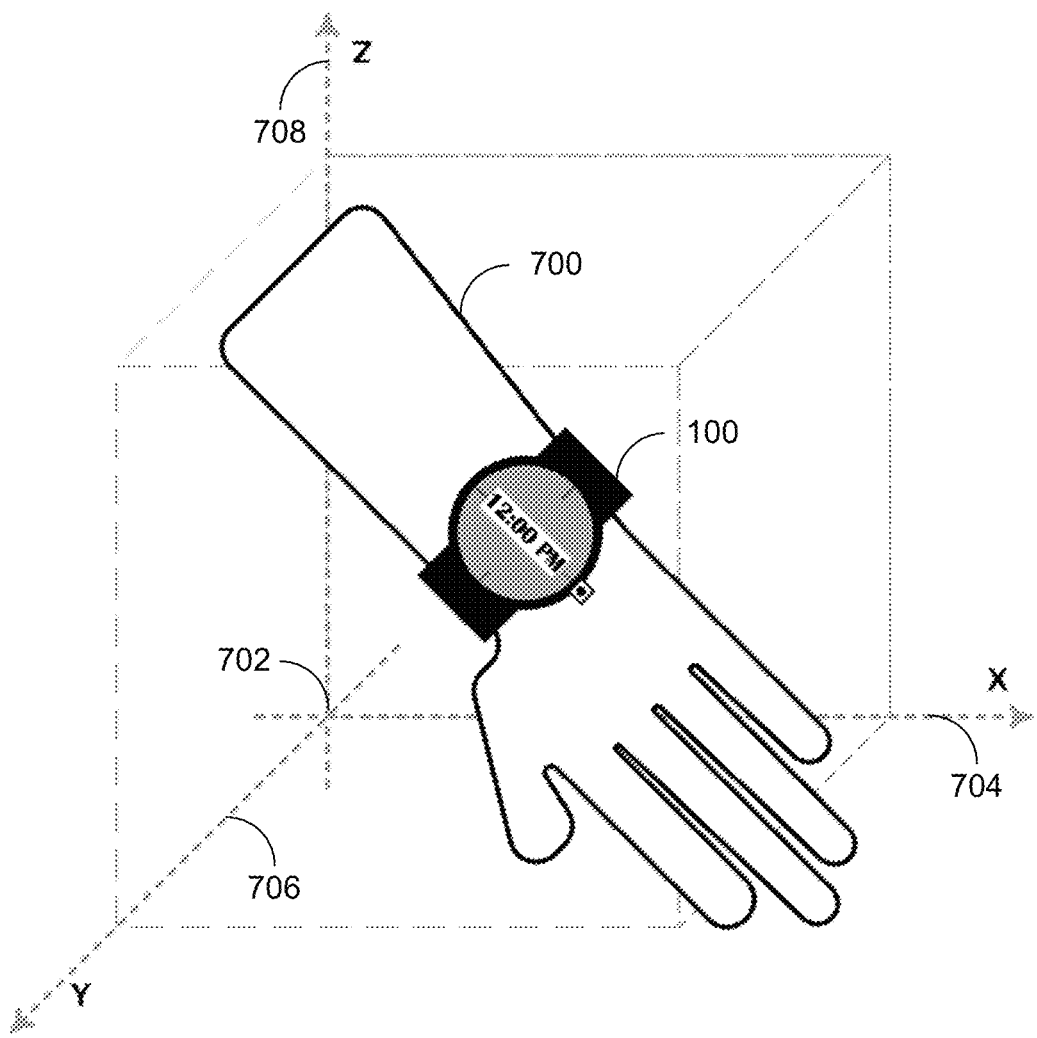
FIG. 7A illustrates an exemplary coordinate system for tracking motion gestures of a wearable mobile device according to aspects of the present disclosure.

FIG. 7A illustrates an exemplary coordinate system for tracking motion gestures of a wearable mobile device according to aspects of the present disclosure. In the example shown in FIG. 7A, the wearable mobile device 100 may be worn on a user's hand 700. The position and orientation of the wearable mobile device 100 may be identified or referenced in a 3-dimensional Cartesian coordination system with origin 702, X axis 704, Y axis 706, and Z axis 708.

In other implementations, the position and orientation of the wearable mobile device 100 may be identified or referenced in a spherical coordinate system (not shown), where the position and orientation of the wearable mobile device 100 may be identified or referenced by the radial distance of wearable mobile device 100 from a fixed origin, its polar angle measured from a fixed zenith direction, and the azimuth angle of its orthogonal projection on a reference plane that passes through the origin and being orthogonal to the zenith, measured from a fixed reference direction on that plane.

As discussed in association with FIG. 2, various types of sensors, including but not limited to, accelerometer, gyroscope, and magnetometer may be used to detect motion gesture sequences. The accelerometer may perform better in detecting linear movements, the gyroscope may perform better in detecting rotations, and the magnetometer may perform better in detecting orientations of the wearable mobile device 100. A combination of two or more such sensors may be used to detect motion gesture sequences of the wearable mobile device 100 according to aspects of the present disclosure.

According to embodiments of the present disclosure, an accelerometer can be a device that measures the acceleration of the wearable mobile device 100. It can be configured to measure the acceleration associated with the weight experienced by a test mass that resides in the frame of reference of the accelerometer. For example, an accelerometer measures a value even if it is stationary, because masses have weights, even though there is no change of velocity. The accelerometer measures weight per unit of mass, a quantity also known as gravitational force or g-force. In other words, by measuring weight, an accelerometer measures the acceleration of the free-fall reference frame (inertial reference frame) relative to itself. In one approach, a multi-axis accelerometer can be used to detect magnitude and direction of the proper acceleration (or g-force), as a vector quantity. In addition, the multi-axis accelerometer can be used to sense orientation as the direction of weight changes, coordinate acceleration as it produces g-force or a change in g-force, vibration, and shock. In another approach, a micro-machined accelerometer can be used to detect position, movement, and orientation of the wearable mobile device 100.

According to embodiments of the present disclosure, a gyroscope can be used to measure rotation and orientation of the wearable mobile device 100, based on the principles of conservation of angular momentum. The accelerometer or magnetometer can be used to establish an initial reference for the gyroscope. After the initial reference is established, the gyroscope can be more accurate than the accelerometer or magnetometer in detecting rotation of the wearable mobile device 100 because it may be less impacted by vibrations, or by the electromagnet fields generated by electrical appliances around the wearable mobile device 100. A mechanical gyroscope can be a spinning wheel or disk whose axle can be free to take any orientation. This orientation may change much less in response to a given external torque than it would without the large angular momentum associated with the gyroscope's high rate of spin. Since external torque may be minimized by mounting the device in gimbals, its orientation may remain nearly fixed, regardless of any motion of the platform on which it may be mounted. In other approaches, gyroscopes based on other operating principles may also be used, such as the electronic, microchip-packaged Micro-electromechanical systems (MEMS) gyroscope devices, solid state ring lasers, fiber optic gyroscopes and quantum gyroscope.

According to embodiments of the present disclosure, a magnetometer can be used to measure orientations by detecting the strength or direction of magnetic fields around the wearable mobile device 100. Various types of magnetometers may be used. For example, a scalar magnetometer measures the total strength of the magnetic field it is subjected to, and a vector magnetometer measures the component of the magnetic field in a particular direction, relative to the spatial orientation of the wearable mobile device 100. In another approach, a solid-state Hall-effect magnetometer can be used. The Hall-effect magnetometer produces a voltage proportional to the applied magnetic field, and it can be configured to sense polarity.

According to aspects of the present invention, a user motion gesture sequence may be detected by a combination of one or more accelerometer, magnetometer, and gyroscope.

Figure 7B:
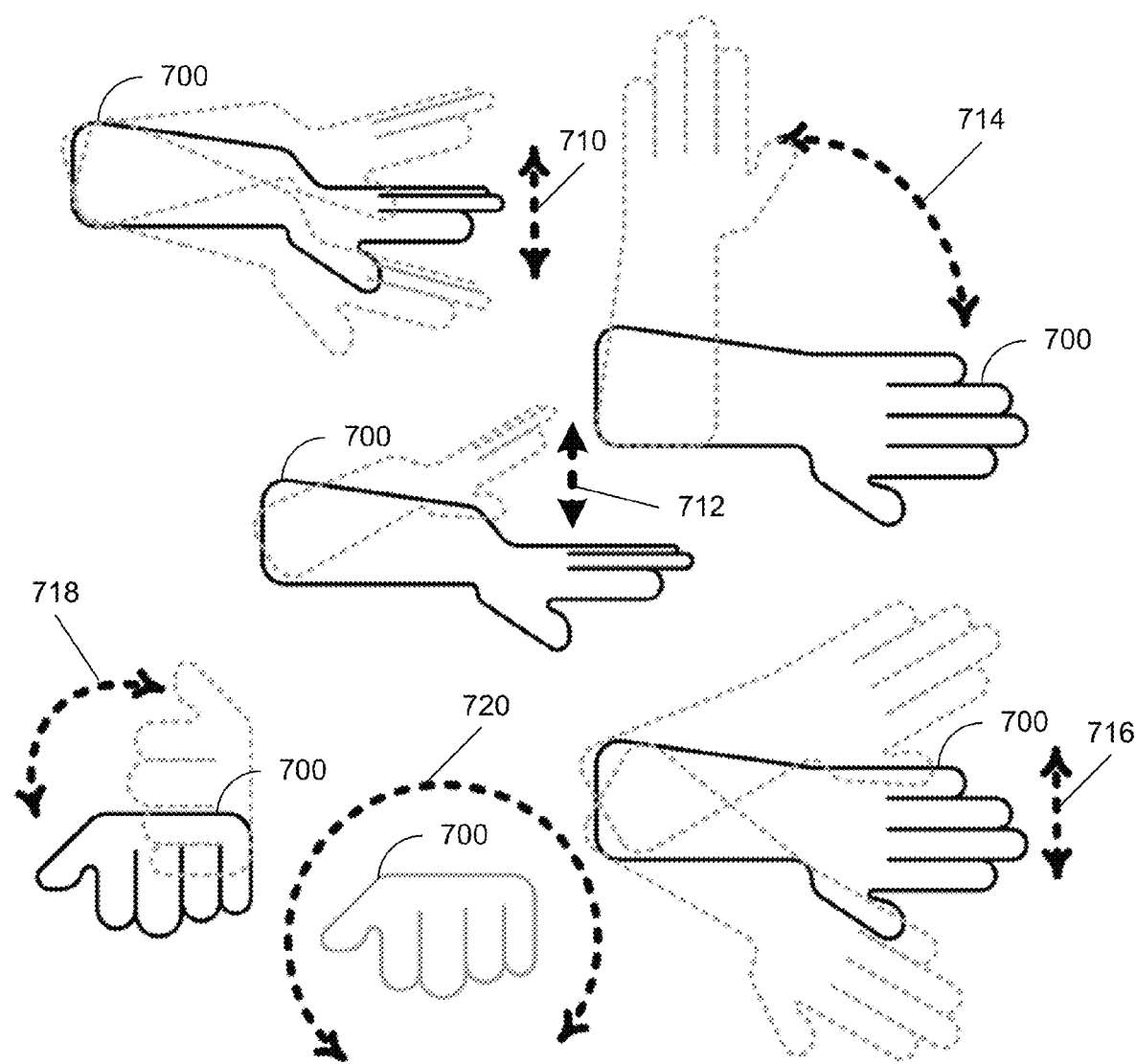
FIG. 7B illustrates exemplary user-directed motion gestures according to aspects of the present disclosure.

FIG. 7B illustrates exemplary user-directed motion gestures according to aspects of the present disclosure. As shown in FIG. 7B, examples of user-directed motion gestures may include but not limited to: 1) waving hand 700 up and down with different ranges of motions such as 710 and 712; 2) pivoting hand 700 at an elbow with different ranges of motions such as 714 and 716; 3) rotating wrist of hand 700 with different ranges of motions such as 718 and 720; and 4) other user-defined motions. According to aspects of the present disclosure, a motion gesture sequence may include any combination of one or more of the above user-directed motion gestures. According to aspects of the present disclosure, the exemplary motion gesture sequences may be performed without visual aid to the user, and may be performed with one hand.

Figure 8A:
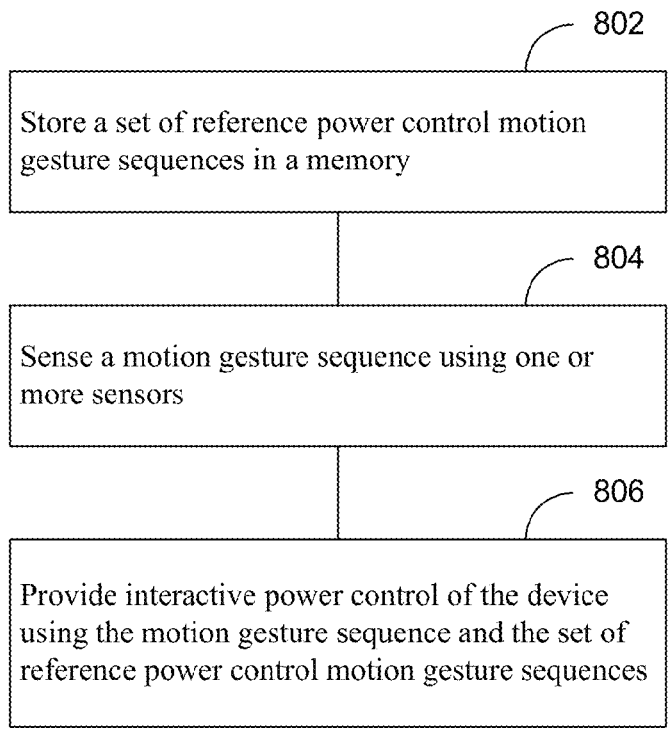
FIG. 8A illustrates an exemplary method for providing power control according to aspects of the present disclosure.

FIG. 8A illustrates an exemplary method for providing power control according to aspects of the present disclosure. In the example shown in FIG. 8A, in block 802, the method stores a set of reference power control motion gesture sequences in a memory. In block 804, the method senses a motion gesture sequence using one or more sensors, such as using one or more of the sensor input devices 202 as described in FIG. 2. In block 806, the method provides interactive power control of the device using the motion gesture sequence and the set of reference power control motion gesture sequences. According to aspects of the present disclosure, the wearable mobile device 100 may be a wrist-worn device. The motion gesture sequence may include one or more motion gestures generated by a user using one hand and without visual assistance.

Figure 8B:
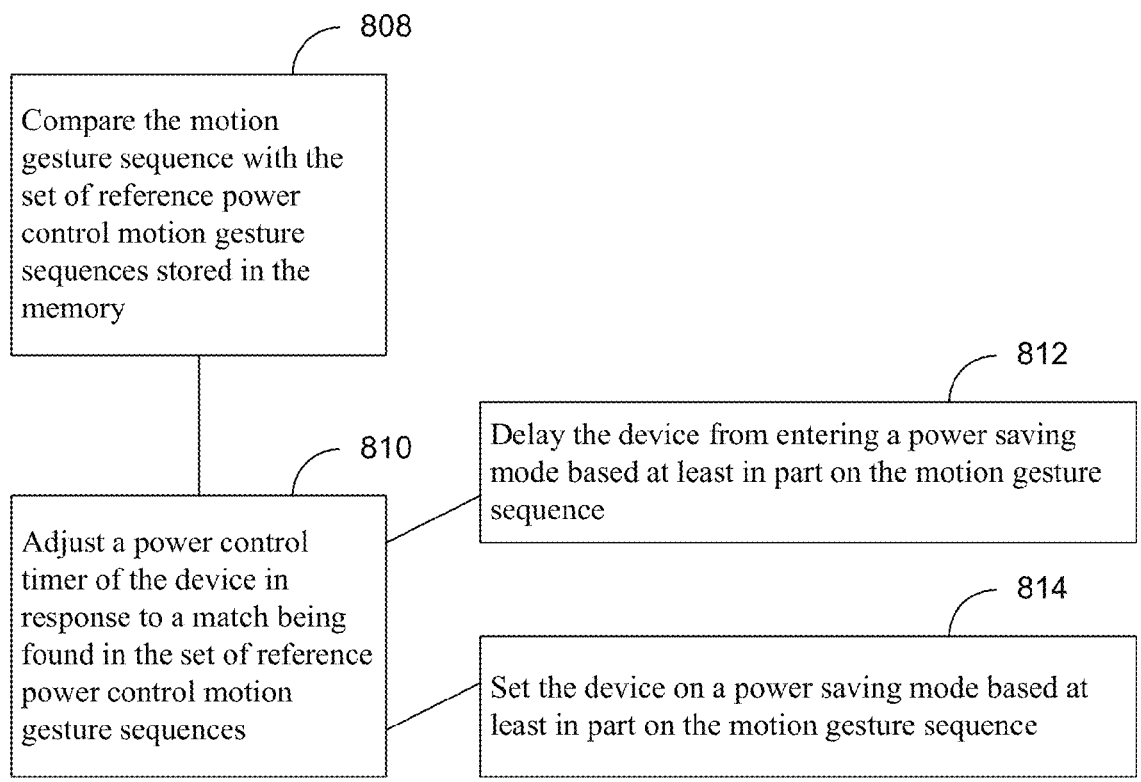
FIG. 8B illustrates an exemplary implementation of providing interactive power control of a device using a motion gesture sequence according to aspects of the present disclosure.

FIG. 8B illustrates an exemplary implementation of providing interactive power control of a device using a motion gesture sequence according to aspects of the present disclosure. As shown in FIG. 8B, in block 808, the method compares the motion gesture sequence with the set of reference power control motion gesture sequences. In block 810, the method adjusts a power control timer of the wearable mobile device 100 in response to a match being found in the set of reference power control motion gesture sequences. According to aspects of the present disclosure, methods performed in block 810 may further comprise methods performed in block 812 and block 814. In block 812, the method delays the wearable mobile device 100 from entering a power saving mode based at least in part on the motion gesture sequence. In block 814, the method sets the wearable mobile device 100 to a power saving mode based at least in part on the motion gesture sequence.

Figure 8C:
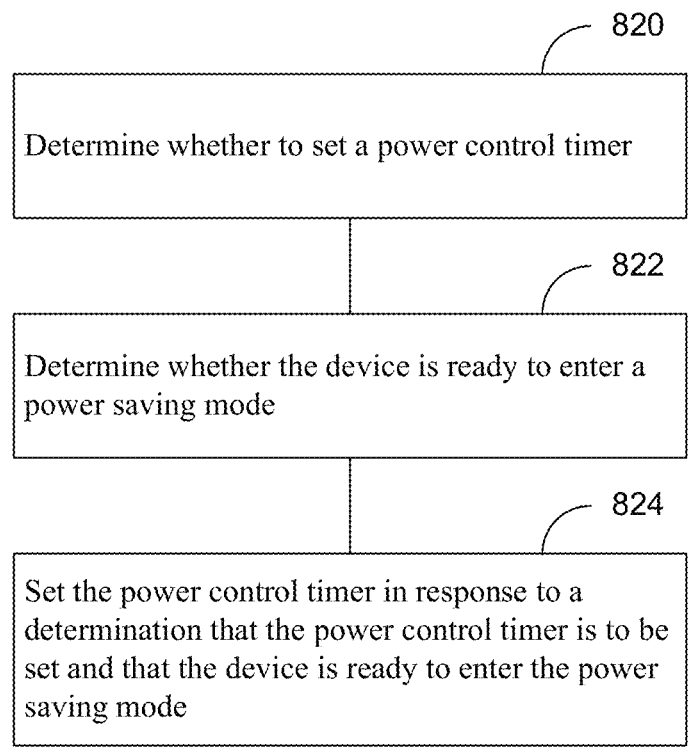
FIG. 8C illustrates another exemplary implementation of providing interactive power control of a device using a motion gesture sequence according to aspects of the present disclosure.

FIG. 8C illustrates another exemplary implementation of providing interactive power control of a device using a motion gesture sequence according to aspects of the present disclosure. As shown in FIG. 8C, in block 820, the method determines whether to set a power control timer. In block 822, the method determines whether the wearable mobile device 100 may be ready to enter a power saving mode. In block 824, the method sets the power control timer in response to a determination that the power control timer is to be set and the wearable mobile device 100 may be ready to enter the power saving mode.

Figure 8D:
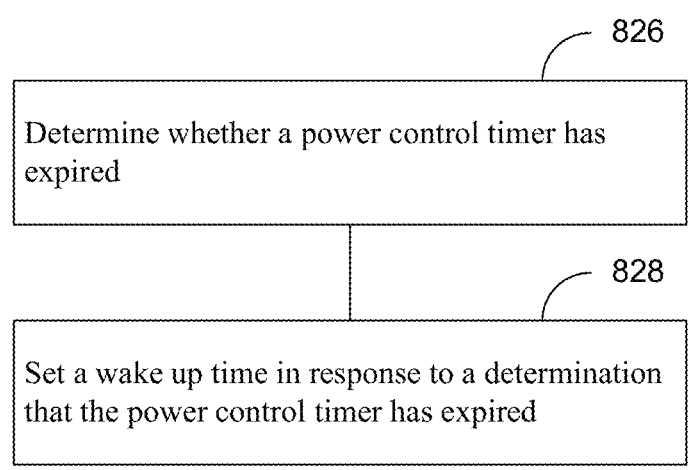
FIG. 8D illustrates yet another exemplary implementation of providing interactive power control of a device using a motion gesture sequence according to aspects of the present disclosure.

FIG. 8D illustrates yet another exemplary implementation of providing interactive power control of a device using a motion gesture sequence according to aspects of the present disclosure. As shown in FIG. 8D, in block 826, the method determines whether a power control timer has expired. In block 828, the method sets a wake up timer in response to the power control timer has expired.

FIG. 9A illustrates an exemplary method for providing access control according to aspects of the present disclosure. In the example shown in FIG. 9A, in block 902, the method stores a set of reference access control motion gesture sequences in a memory. In block 904, the method senses a motion gesture sequence using one or more sensors, such as using one or more of the sensor input devices 202 as described in FIG. 2. In block 906, the method determines a valid access control motion gesture sequence using the motion gesture sequence and the set of reference access control motion gesture sequences. According to aspects of the present disclosure, the wearable mobile device 100 may be a wrist-worn device. The motion gesture sequence may include one or more motion gestures generated by a user using one hand and without visual assistance.

FIG. 9B illustrates an exemplary implementation of determining a valid motion gesture sequence for access control according to aspects of the present disclosure. As shown in FIG. 9B, in block 908, the method compares the motion gesture sequence with the set of reference access control motion gesture sequences stored in the memory. In block 910, the method identifies the valid access control motion gesture sequence in response to a match being found in the set of reference access control motion gesture sequences. Upon identifying the valid access control motion gesture sequence, the method may grant access control to the mobile device and a user may start using the mobile device.

FIG. 9C illustrates another exemplary implementation of determining a valid motion gesture sequence for access control according to aspects of the present disclosure. In the exemplary implementation shown in FIG. 9C, in block 912, the method generates a prompt to a user requesting a particular access control motion gesture sequence. In block 914, the method receives a response motion gesture sequence from the user. In block 916, the method determines whether there is a match between the response motion gesture sequence and the particular access control motion gesture sequence. According to aspects of the present disclosure, the prompt comprises a haptic message received by the user. The particular access control motion gesture sequence may be selected from a plurality of access control motion gesture sequences in the set of reference access control motion gesture sequences.

According to aspects of the present disclosure, some of the benefits of the disclosed embodiments are described as following. First, motion gesture can be subtle and un-intrusive (organic) as compared to other sensor modalities. It can enable user interactions with the wearable mobile device with substantially lower power overhead. Second, the complexity of a motion gesture sequence can be scaled according to the significance of corresponding operation that may be controlled. For example, a motion gesture sequence for power control can be less stringent than a motion gesture sequence for access control.

In one embodiment, a method for providing access control of a device may include a memory configured to store a set of reference access control motion gesture sequences, one or more sensors configured to sense a motion gesture sequence, and a controller configured to determine a valid access control motion gesture sequence using the motion gesture sequence and the set of reference access control motion gesture sequences. In some implementations, the device can be a wrist-worn device. The motion gesture sequence comprises one or more motion gestures generated by a user using one hand, and without visual assistance. The controller configured to determine the valid access control motion gesture sequence may comprise logic configured to compare the motion gesture sequence with the set of reference access control motion gesture sequences stored in the memory, and logic configured to identify a valid motion gesture sequence in response to a match being found in the set of reference access control motion gesture sequences. The controller configured to determine the valid access control motion gesture sequence may further comprise logic configured to generate a prompt to a user requesting a particular access control motion gesture sequence, logic configured to receive a response motion gesture sequence from the user, and logic configured to determine whether there is a match between the response motion gesture sequence and the particular access control motion gesture sequence. In some implementations, the prompt comprises a haptic message received by the user. The particular access control motion gesture sequence may be selected from a plurality of access control motion gesture sequences in the set of reference access control motion gesture sequences.

In another embodiment, a method of providing access control of a device may comprise storing a set of reference access control motion gesture sequences in a memory, sensing a motion gesture sequence using one or more sensors, and determining a valid access control motion gesture sequence using the motion gesture sequence and the set of reference access control motion gesture sequences. The method of determining the valid access control motion gesture sequence may comprise comparing the motion gesture sequence with the set of reference access control motion gesture sequences stored in the memory, and identifying the valid access control motion gesture sequence in response to a match being found in the set of reference access control motion gesture sequences. The method of determining the valid access control motion gesture sequence may further comprise generating a prompt to a user requesting a particular access control motion gesture sequence, receiving a response motion gesture sequence from the user, and determining whether there is a match between the response motion gesture sequence and the particular access control motion gesture sequence.

In yet another embodiment, a computer program product may comprise non-transitory medium storing instructions for execution by one or more computer systems. The instructions may comprise instructions for storing a set of reference access control motion gesture sequences in a memory of a device, instructions for sensing a motion gesture sequence using one or more sensors, and instructions for determining a valid access control motion gesture sequence using the motion gesture sequence and the set of reference access control motion gesture sequences. The instructions for determining the valid access control motion gesture sequence may comprise instructions for comparing the motion gesture sequence with the set of reference access control motion gesture sequences stored in the memory, and instructions for identifying the valid access control motion gesture sequence in response to a match being found in the set of reference access control motion gesture sequences. The instructions for determining the valid access control motion gesture sequence may further comprise instructions for generating a prompt to a user requesting a particular access control motion gesture sequence, instructions for receiving a response motion gesture sequence from the user, and instructions for determining whether there is a match between the response motion gesture sequence and the particular access control motion gesture sequence.

In yet another embodiment, a device may comprise means for storing a set of reference access control motion gesture sequences, means for sensing a motion gesture sequence, and means for determining a valid access control motion gesture sequence using the motion gesture sequence and the set of reference access control motion gesture sequences. The means for determining the valid access control motion gesture sequence may comprise means for comparing the motion gesture sequence with the set of reference access control motion gesture sequences stored in the memory, and means for identifying the valid access control motion gesture sequence in response to a match being found in the set of reference access control motion gesture sequences. The means for determining the valid access control motion gesture sequence may further comprise means for generating a prompt to a user requesting a particular access control motion gesture sequence, means for receiving a response motion gesture sequence from the user, and means for determining whether there is a match between the response motion gesture sequence and the particular access control motion gesture sequence.

Note that the subsequent paragraphs, FIG. 1, FIG. 2, FIG. 3, FIG. 5, FIGS. 8A-8D and their corresponding descriptions provide means for storing a set of reference power control motion gesture sequences; means for sensing a motion gesture sequence; means for providing interactive power control of the device using the motion gesture sequence and the set of reference power control motion gesture sequences; means for comparing the motion gesture sequence with the set of reference power control motion gesture sequences; means for adjusting a power control timer of the device in response to a match being found in the set of reference power control motion gesture sequences; means for delaying the device from entering a power saving mode based at least in part on the motion gesture sequence; means for setting the device on a power saving mode based at least in part on the motion gesture sequence; means for determining whether to set a power control timer; means for determining whether the device is ready to enter a power saving mode; means for setting the power control timer in response to a determination that the power control timer is to be set and that the device is ready to enter the power saving mode; means for determining whether a power control timer has expired; and means for setting a wake up time in response to a determination that the power control timer has expired.

Note that the subsequent paragraphs, FIG. 1, FIG. 2, FIG. 4, FIG. 6, FIGS. 9A-9C and their corresponding descriptions provide means for storing a set of reference access control motion gesture sequences; means for sensing a motion gesture sequence; means for determining a valid access control motion gesture sequence using the motion gesture sequence and the set of reference access control motion gesture sequences; means for comparing the motion gesture sequence with the set of reference access control motion gesture sequences stored in the memory; means for identifying the valid access control motion gesture sequence in response to a match being found in the set of reference access control motion gesture sequences; means for generating a prompt to a user requesting a particular access control motion gesture sequence; means for receiving a response motion gesture sequence from the user; and means for determining whether there is a match between the response motion gesture sequence and the particular access control motion gesture sequence.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver.

Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

I claim:

1. A device, comprising:
   a memory configured to store a set of reference power control motion gesture sequences;
   one or more sensors configured to sense a motion gesture sequence; and
   a controller configured to provide interactive power control of the device using the motion gesture sequence and the set of reference power control motion gesture sequences, wherein the controller is further configured to:
   compare the motion gesture sequence with the set of reference power control motion gesture sequences, and
   adjust a power control timer of the device in response to a match being found in the set of reference power control motion gesture sequences.

2. The device of claim 1, wherein the device is a wrist-worn device.

3. The device of claim 1, wherein the motion gesture sequence comprises one or more motion gestures generated by a user using one hand.

4. The device of claim 1, wherein the motion gesture sequence comprises one or more motion gestures generated by a user without visual assistance.

5. The device of claim 1, wherein the controller is further configured to:
   delay the device from entering a power saving mode based at least in part on the motion gesture sequence.

6. The device of claim 1, wherein the controller is further configured to:
   set the device on a power saving mode based at least in part on the motion gesture sequence.

7. The device of claim 1, wherein the controller is further configured to:
   determine whether to set a power control timer;
   determine whether the device is ready to enter a power saving mode; and
   set the power control timer in response to a determination that the power control timer is to be set and that the device is ready to enter the power saving mode.

8. The device of claim 1, wherein the controller is further configured to:
   determine whether a power control timer has expired; and
   set a wake up time in response to a determination that the power control timer has expired.

9. A method of providing power control of a device, comprising:
   storing a set of reference power control motion gesture sequences in a memory;
   sensing a motion gesture sequence using one or more sensors; and
   providing interactive power control of the device using the motion gesture sequence and the set of reference power control motion gesture sequences, wherein the providing interactive power control of the device comprises:
   comparing the motion gesture sequence with the set of reference power control motion gesture sequences; and
   adjusting a power control timer of the device in response to a match being found in the set of reference power control motion gesture sequences.

10. The method of claim 9, wherein the device is a wrist-worn device.

11. The method of claim 9, wherein the motion gesture sequence comprises one or more motion gestures generated by a user using one hand.

12. The method of claim 9, wherein the motion gesture sequence comprises one or more motion gestures generated by a user without visual assistance.

13. The method of claim 9, wherein the adjusting the power control timer of the device comprises:
   delaying the device from entering a power saving mode based at least in part on the motion gesture sequence.

14. The method of claim 9, wherein the adjusting the power control timer of the device comprises:
   setting the device on a power saving mode based at least in part on the motion gesture sequence.

15. The method of claim 9, wherein the providing interactive power control of the device further comprises:
   determining whether to set a power control timer;
   determining whether the device is ready to enter a power saving mode; and
   setting the power control timer in response to a determination that the power control timer is to be set and that the device is ready to enter the power saving mode.

16. The method of claim 9, wherein the providing interactive power control of the device further comprises:
   determining whether a power control timer has expired; and
   setting a wake up time in response to a determination that the power control timer has expired.

17. A computer program product comprises non-transitory medium storing instructions for execution by one or more computer systems, wherein the instructions comprise:
- instructions for sensing a motion gesture sequence using one or more sensors; and
- instructions for providing interactive power control of a device using the motion gesture sequence and a set of reference power control motion gesture sequences stored in a memory of the device, wherein the instructions for providing interactive power control of the device comprises:
- instructions for comparing the motion gesture sequence with the set of reference power control motion gesture sequences; and
- instructions for adjusting a power control timer of the device in response to a match being found in the set of reference power control motion gesture sequences.

18. The computer program product of claim 17, wherein the instructions for adjusting the power control timer of the device comprises:
- instructions for delaying the device from entering a power saving mode based at least in part on the motion gesture sequence.

19. The computer program product of claim 17, wherein the instructions for adjusting the power control timer of the device comprises:
- instructions for setting the device on a power saving mode based at least in part on the motion gesture sequence.

20. The computer program product of claim 17, wherein the instructions for providing interactive power control of the device further comprises:
- instructions for determining whether to set a power control timer;
- instructions for determining whether the device is ready to enter a power saving mode; and
- instructions for setting the power control timer in response to a determination that the power control timer is to be set and that the device is ready to enter the power saving mode.

21. The computer program product of claim 17, wherein the instructions for providing interactive power control of the device further comprises:
- instructions for determining whether a power control timer has expired; and
- instructions for setting a wake up time in response to a determination that the power control timer has expired.

22. A device:
- means for storing a set of reference power control motion gesture sequences;
- means for sensing a motion gesture sequence; and
- means for providing interactive power control of the device using the motion gesture sequence and the set of reference power control motion gesture sequences, wherein the means for providing interactive power control of the device comprises:
- means for comparing the motion gesture sequence with the set of reference power control motion gesture sequences; and
- means for adjusting a power control timer of the device in response to a match being found in the set of reference power control motion gesture sequences.

23. The device of claim 22, wherein the means for adjusting the power control timer of the device comprises:
- means for delaying the device from entering a power saving mode based at least in part on the motion gesture sequence.

24. The device of claim 22, wherein the means for adjusting the power control timer of the device comprises:
- means for setting the device on a power saving mode based at least in part on the motion gesture sequence.

25. The device of claim 22, wherein the means for providing interactive power control of the device further comprises:
- means for determining whether to set a power control timer;
- means for determining whether the device is ready to enter a power saving mode; and
- means for setting the power control timer in response to a determination that the power control timer is to be set and that the device is ready to enter the power saving mode.

26. The device of claim 22, wherein the means for providing interactive power control of the device further comprises:
- means for determining whether a power control timer has expired; and
- means for setting a wake up time in response to a determination that the power control timer has expired.

* * * * *